May 22, 1945. G. B. SAYRE 2,376,624
AUTOMATIC VALVE CONTROL FOR HYDRAULIC PRESSES
Original Filed Nov. 12, 1938 5 Sheets-Sheet 1
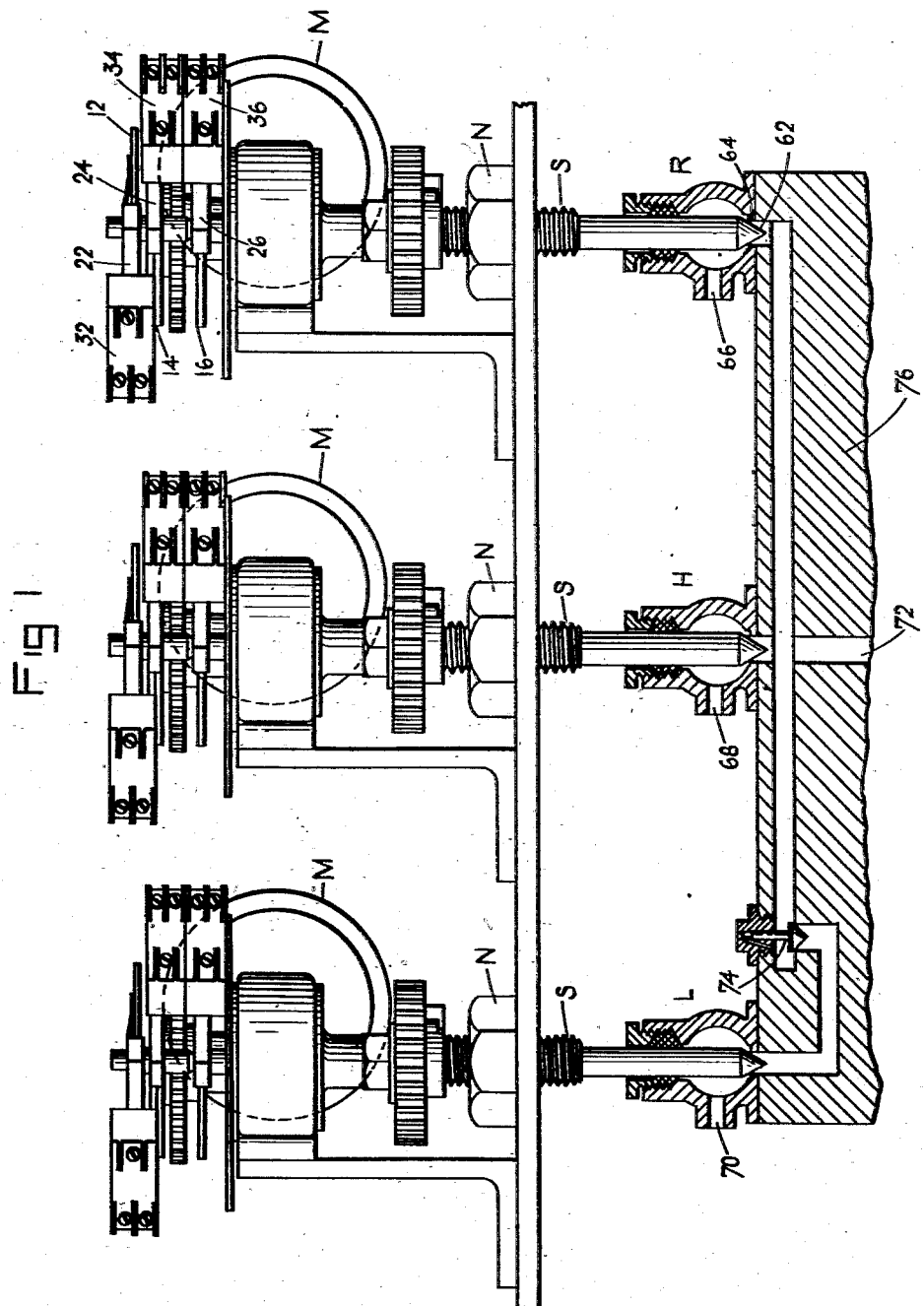
INVENTOR
GORDON B. SAYRE
BY
ATTORNEYS

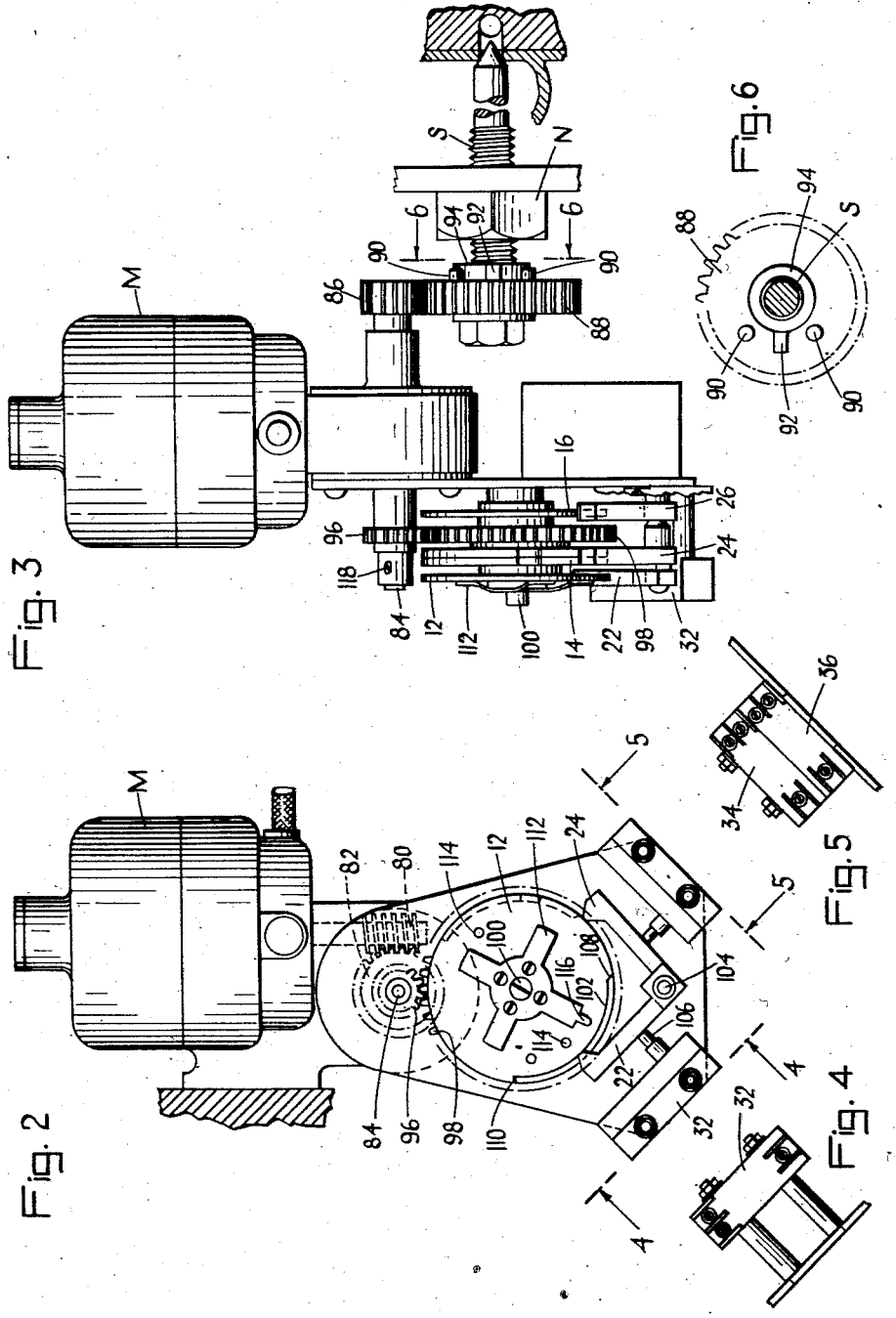

May 22, 1945. G. B. SAYRE 2,376,624
AUTOMATIC VALVE CONTROL FOR HYDRAULIC PRESSES
Original Filed Nov. 12, 1938 5 Sheets-Sheet 3
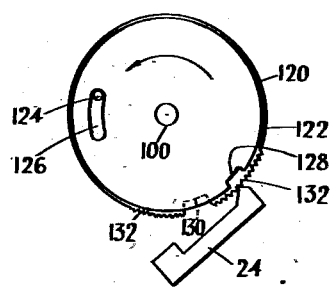
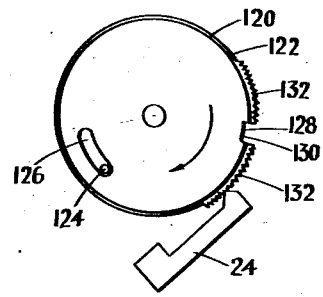
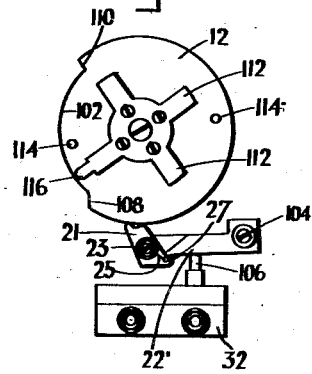
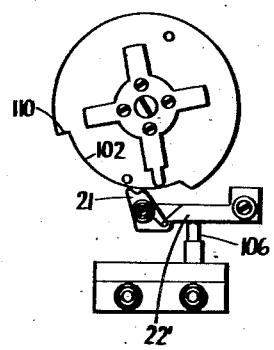
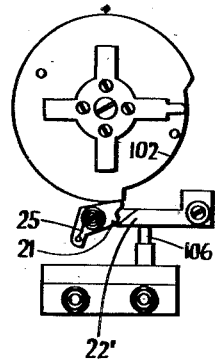
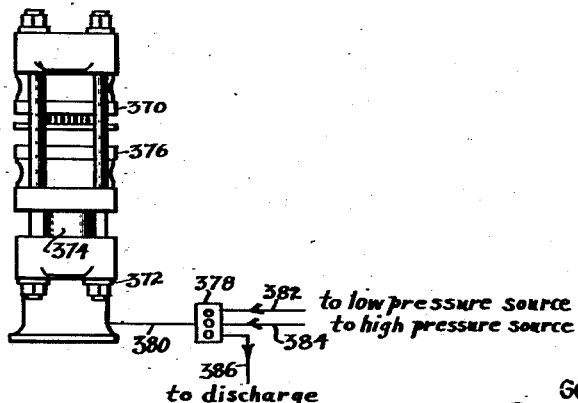
INVENTOR
GORDON B. SAYRE
BY
ATTORNEYS

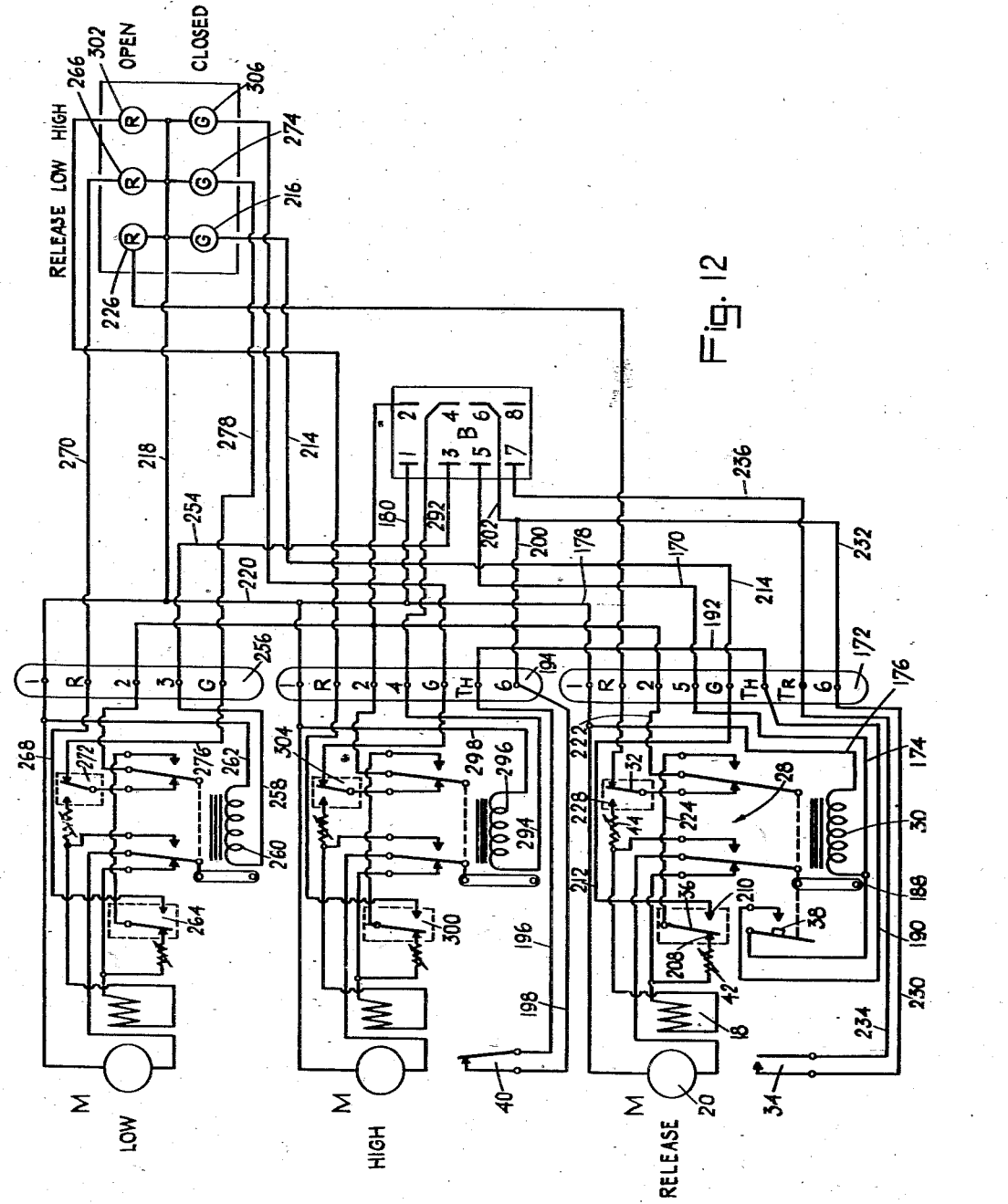

May 22, 1945. G. B. SAYRE 2,376,624
AUTOMATIC VALVE CONTROL FOR HYDRAULIC PRESSES
Original Filed Nov. 12, 1938 5 Sheets-Sheet 5
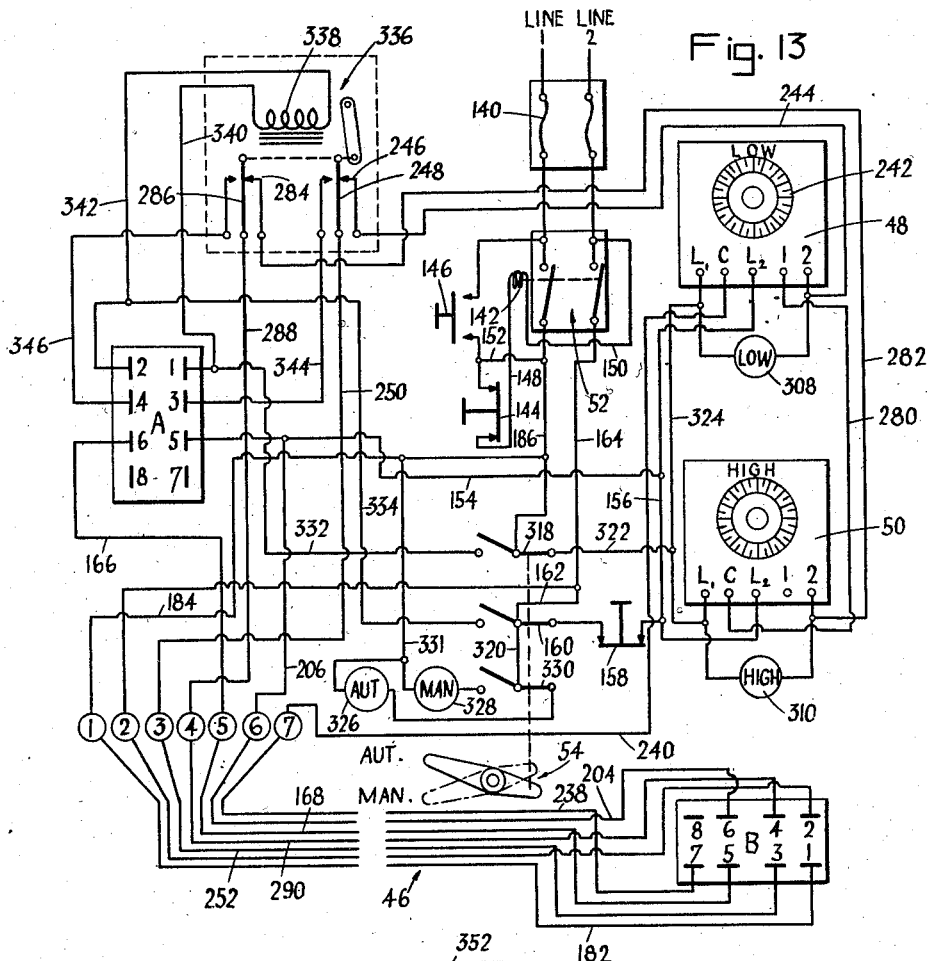
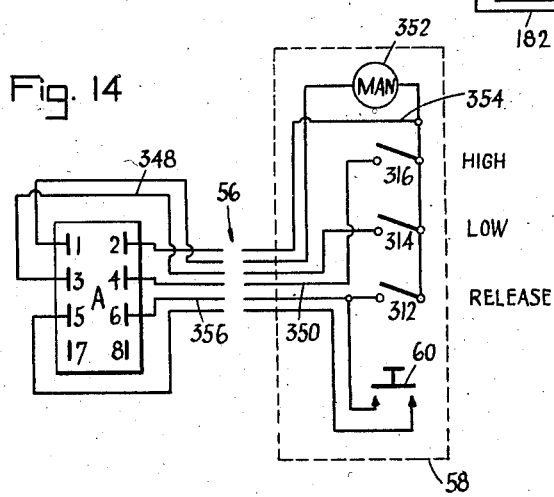
INVENTOR
GORDON B. SAYRE
BY
ATTORNEYS Patented May 22, 1945

2,376,624

UNITED STATES PATENT OFFICE 2,376,624

AUTOMATIC VALVE CONTROL FOR HYDRAULIC PRESSES

Gordon B. Sayre, Boonton, N. J., assignor to Boonton Molding Company, Boonton, N. J., a corporation of New Jersey Original application November 12, 1938, Serial No. 239,933. Divided and this application January 21, 1942, Serial No. 427,594

21 Claims. (Cl. 121—46.5)

This invention relates to automatic valve controlling mechanisms, and more particularly to such a mechanism for controlling hydraulic presses. It is described as applied to the molding of plastics.

A hydraulic press may be worked from two pressure sources, a low pressure source being used to close the press, and a high pressure source being used to thereafter force the press tightly closed, thus economizing in the use of the high pressure fluid. The operation of the press may be controlled by three manually operated screw stem needle valves, one acting as a release valve, and the other two valves acting as low and high pressure valves. In normal condition, the release valve is open and the pressure valves are closed. The press is open. To close the press, the release valve is closed, and the low pressure valve is then opened. After the press is closed, and after a suitable period of treatment or cure of the plastic under low pressure, the high pressure valve is opened, and the low pressure valve is closed. This should be done after opening of the high pressure valve, for otherwise the ram will back slightly when the low pressure valve is closed, and there then will be a thump or sharp blow when the high pressure valve is opened. This shocks the mold and the entire press, and is wasteful of high pressure fluid. The three valve combination includes a check valve to prevent flow of high pressure fluid through the low pressure valve or into the low pressure line when the high pressure valve is opened. After an appropriate period of cure under high pressure, the high pressure valve is closed and the release valve is opened, thus causing opening of the press.

If the curing time is too long, the molded pieces tend to crack, and if the curing time is too short, they tend to blister. The situation is especially critical when making pieces with undercuts which are stripped directly from the mold, in accordance with the method described in United States Reissue Patent No. 19,000, granted to George K. Scribner on November 14, 1933. With the direct stripping method of the said patent, the permissible range of timing is very slight, being a matter of only a few seconds in the case of bottle caps, for example. With ordinary molding practice (as when the bottle caps are unscrewed instead of stripped), a longer range of time variation may be permissible, but even then for optimum results in strength and finish of the molded pieces, the correct cure should be maintained as closely as possible.

As some assistance to the operator, a clock or timing device may be provided, this being started or wound by the operator after he opens the low pressure valve. The operator then opens the high pressure valve either by estimated time, or by watching the press to see when it appears to stop creeping. When the time runs out, the high pressure valve is closed. The timing is only approximate because of the lag in starting the clock and the lag in closing the high pressure valve after the clock runs out. Moreover, the apportionment in time between the low pressure and high pressure treatment is crude. Pieces from the same cavity in the mold will vary from one molding cycle to the next solely because of the difference in cure.

Another difficulty with hand operation is the tendency on the part of the operator to close the low pressure valve before opening the high pressure valve, this being slightly easier for the operator because he already has his hand on the low pressure valve when opening the same. This incorrect sequence of valve operation produces a thump or blow in the press, as has already been mentioned. Also, with hand operation, there is more rapid erosion of the valve than should theoretically take place, because it is difficult to begin opening a pressure valve against the pressure exerted thereon, and the operator tends to first hit the valve handle in order to start the valve, following which he grasps the handle and turns the valve more widely open. The greatest erosion of valve surface takes place during this period when the valve is cracked only slightly open.

Of course, other valves than the screw stem needle valve have been proposed, such as rotary, poppet, and piston valves. However, these have not proved satisfactory in practice because they cannot be kept tight under the tremendous high pressures used, or require constant attendance to maintain the same tight. A leaky valve means a creeping press, which is dangerous to the operator and to the mold. The screw stem needle valve is simple and remains tight for a comparatively long time. It has a readily renewable seat and stem, and a repair, when necessary, consists merely in changing the seat and stem, the old seat and stem being faced in the tool room. The press remains in operation, for there is always a supply of properly faced seats and stems on hand.

Automatic valve control has heretofore been proposed, but only in connection with special valves different from the screw stem needle valve. The timing has been based on cam operation, and while these cams may be made adjustable, they are not direct reading in seconds of time, and it is in time units that the operator or cycle adjuster normally thinks. Difficult adjustments discourage close adjustments, and the special valves required also have been a constant source of maintenance trouble.

The primary object of the present invention is to overcome the foregoing difficulties. A more particular object is to provide an automatic valve control mechanism which will employ the standard and long approved screw stem needle valves. Still another object is to make possible accurate adjustment of the curing cycle in seconds of time, and further, to make this adjustment independent for the low pressure and high pressure parts of the cycle. For this purpose, I employ two dial clocks, one for the low pressure valve, and the other for the high pressure valve. The low pressure may thus be maintained for a definite time before the high pressure is admitted, and the high pressure is maintained for a definite time before the high pressure valve is closed and the release valve opened, each of these curing times being accurately and independently adjustable. The curing time is readily variable, which is convenient not only when changing the piece being molded, or the composition being handled, but even when using the same material for the same piece because of small but inevitable changes in the characteristics of the batches of material. Sometimes, there is a variation in cure with the same batch of material after several days of operation, due to unavoidable absorption of a slight percentage of moisture.

Still another object is to establish a valve control cycle in which the high pressure valve is opened before the low pressure valve is closed. A further object is to insure tight closing of the valve and to insure opening of even a tightly closed valve against high pressure fluid while using a comparatively small driving motor for the valve. For this purpose, the motor is geared to the valve stem through a train of reduction gearing, and a lost motion connection is provided in the gear train which permits acceleration of the motor before the motor torque is applied to the valve stem. Still another object of my invention is to provide appropriate motion limit switches for each valve motor, said switches functioning to open the valve closing circuit of the motor when the valve is closed, and to open the valve opening circuit of the motor when the valve is opened a desired amount. In accordance with an ancillary feature of the invention, this desired amount of valve opening is made readily adjustable.

A further object of the present invention is to provide suitable means for initiating the operation of a timing clock or of another valve in response to operation of a valve. For example, closing of the release valve may be used to initiate opening of the low pressure valve, as well as starting of the low pressure clock. The low pressure valve must not be opened before closing of the release valve because there will obviously be a loss of pressure fluid, and then a water hammer when the release valve is finally closed. In accordance with a feature of the present invention, the release valve is provided with a switch which may, for convenience, be termed a transfer switch, said switch functioning on closing of the release valve to initiate opening of the low pressure valve. It is important that this switch should not function during opening of the release valve, and it is accordingly a further feature and object of my invention to provide a transfer switch mechanism which will function in one direction, specifically, closing of the valve, and not in the other direction, or during opening of the valve.

Still another object of my invention resides in the provision of appropriate switch mechanism and wiring for converting the apparatus from automatic control under timing clocks to manual control in response to independently manipulatable switches for each of the valves. This is of convenience to bring the press to a desired position, as when mounting a new die in the press, i. e., setting up the machine for operation, and also, after the machine has been set up, to experiment with different timing or curing, and to make a number of trial runs before putting the apparatus under fully automatic control.

The valve control apparatus is here described as applied to an ordinary press which is to be loaded and unloaded manually and which is to be operated one molding cycle at a time, each cycle requiring depression of a starting button located conveniently near the operator. It will be understood, however, that the automatic valve control may be used with, and, in fact, forms an important part of, a completely automatic molding machine in which the press is loaded and unloaded mechanically, the molding cycles being repeated one after another without manual intervention of any kind, all as is more fully described in my co-pending application, Serial No. 307,268, filed December 2, 1939.

The present application is a division of my parent application Serial No. 239,933, filed November 12, 1938. The single valve and motor assembly is not claimed herein, it being claimed in said parent application.

To the accomplishment of the foregoing, and other objects which will hereinafter appear, my invention consists in the automatic valve control elements, and their relation one to the other, as hereinafter are more particularly described in the specification and sought to be defined in the claims. The specification is accompanied by drawings, in which:

Fig. 1 is a partially sectioned front elevation of a motor-driven valve assembly embodying features of my invention;

Fig. 2 shows one of the three valve units in plan;

Fig. 3 shows one of the three valve units in side elevation;

Fig. 4 is an elevation of the valve open limit switch taken at the line 4—4 of Fig. 2;

Fig. 5 is an elevation of the transfer switch and valve closing limit switch taken at 5—5 of Fig. 2;

Fig. 6 is explanatory of a lost motion connection which is provided in the reduction gear train between the motor and valve stem taken on 6—6 of Fig. 3;

Fig. 7 shows the transfer disc and follower in valve opening condition;

Fig. 8 is a similar view showing the parts in valve closing condition;

Fig. 9 is explanatory of a modified open limit switch which may be used for the high pressure valve, showing the same in closed position;

Fig. 10 is similar but illustrates the switch in open position;

Fig. 11 is similar and illustrates the action of the special follower if the valve coasts excessively to overrun position;

Fig. 12 is a schematic wiring diagram explanatory of the wiring of the motors, switches, and indicator lamps at the valve assembly;

Fig. 13 is a schematic wiring diagram explanatory of the wiring of the timing clocks and switches at the clock panel;

Fig. 14 is a wiring diagram explanatory of the wiring of a small control panel which is disposed within convenient reach of the operator; and Figure 15 is an elevation of a typical molding press with the valve assembly schematically shown connected thereto.

Referring to the drawings, and in particular to Figure 15, the molding press there shown comprises a stationary head 370, connected by tie rods to a cylinder 372, the ram 374 of which carries a movable head 376. A valve assembly 378 is connected with cylinder 372 by means of a pipe 380. Low and high pressure sources are connected to the valve assembly 378 by pipes 382 and 384 respectively, while a discharge pipe 386 leads from the valve assembly.

Referring now to Figs. 1 through 5, the valve assembly comprises three valves, a release valve generally designated R, a low pressure valve generally designated L, and a high pressure valve generally designated H. These valves are of the screw stem needle type, the threaded stems S being received in matingly threaded stationary nuts N. Each valve is provided with a valve operating motor M, said motor being geared to the valve stem S through appropriate reduction gearing. A switch control shaft is also provided at each valve, this preferably being geared to the motor in still lower reduction ratio. Said control shaft carries (in the case of the release valve R) an open limit disc 12, a transfer disc 14, and a closing limit disc 16, said discs cooperating with respective followers 22, 24, and 26, which in turn operate the respective switches 32, 34, and 36, the switch 32 being an open limit switch functioning to open the valve opening circuit of the motor, the switch 34 being a transfer switch functioning to initiate the next desired operation, in this case the opening of the low pressure valve and the starting of the low pressure clock, and the switch 36 being a closing limit switch functioning to open the valve closing circuit of the motor.

For purposes of brief preliminary description of the apparatus, attention is next directed to the wiring diagram of Fig. 12, which shows the wiring of the parts localized at the valve assembly. The motors M for the low pressure, high pressure, and release valves are clearly shown at the left-hand part of the diagram. Referring to the release valve, the open limit switch is shown at 32, the transfer switch at 34, and the closing limit switch at 36. The motor is, of course, a reversing motor, its field 18 and armature 20 being brought out separately and connected to a magnetically operated reversing switch generally designated 28. This magnetic switch is biased to be normally in valve opening position, but on energization of magnet 30, the switch is pulled to valve closing position. For reasons subsequently described, a holding contact 38 is connected to the reversing switch 28.

The elements for the high pressure valve and low pressure valve are generally like those for the release valve, except that the transfer switch 40 for the high pressure valve is a normally closed switch instead of a normally open switch like transfer switch 34, while the low pressure valve has no transfer switch at all. Also, the holding contractor 38 of the release valve is not needed in the low and high pressure valves. Moreover, the wiring of the motor is reversed in the case of the low and high pressure valves so that these valves are normally closed, whereas the release valve is normally open.

The limit switches 32 and 36 are double throw, rather than single throw switches, merely for convenience in operating indicator lamps shown at the upper right-hand part of the diagram. There is a red and green lamp for each valve, the red lamp being lighted when the valve is open, and the green lamp being lighted when the valve is closed. Separate speed control rheostats 42 and 44 are employed in the valve opening and valve closing circuits of each motor, this being convenient to provide independent adjustment of the closing and opening torque applied to the valve by the motor. In the case of the pressure valves, for example, a greater torque may be needed to unseat the closed valve than to close the valve in the first instance.

The wiring at the valve assembly terminates in a connector B. Referring to Fig. 13, the connector B there shown mates with connector B of Fig. 12 and extends, by means of a suitable flexible cable 46, to a clock panel or switch box, the wiring of which is shown in Fig. 13. The low pressure timing clock is indicated at 48, and the high pressure clock at 50. Power for the entire system comes in through conventional lighting lines indicated at line 1 and line 2. A master switch generally designated 52 may be used to energize or deenergize the complete system. Another switch generally designated 54 may be used to change the motor control from "automatic" to "manual," or, in other words, to dispense with the timing clocks. The wiring at the clock panel includes a connector A. This mates with the connector A of Fig. 14, which is disposed at the end of a flexible cable 56 of suitable length, said cable leading to a small control panel 58. This control panel has a starting button 60 for starting each cycle of press operation. It is also provided with switches for manual control of the valve operating motors. It will be understood that the control panel 58 is disposed conveniently near the operator during operation of the press. The clock panel of Fig. 13 is disposed at any convenient point though it is preferably kept reasonably near the press in order to facilitate adjustment of the timing of the cycle. The parts shown in Fig. 12 are all disposed immediately at the valve assembly which, in turn, is located at any point near the press selected for convenience in piping the high and low pressure fluids to the press.

Considering the valve structure in greater detail, and referring first to Fig. 1, the conical lower end 62 of the valve stem bears against a mating valve seat 64. The external line, in this case the release line, is connected at 66. Similarly, the high pressure line is connected at 68, and the low pressure line at 70. The discharge sides of all three valves are connected together at 72, from which a suitable pipe leads to the main cylinder of the press. A check valve 74 is provided between the high and low pressure valves H and L, and faces in such direction as to prevent passage of high pressure fluid from the high pressure valve to the low pressure valve. This is important in view of the fact, as was already explained, that the high pressure valve is preferably opened before the low pressure valve is closed. It will be understood that the particular structural layout for the valve assembly, including the valve body 76, is merely schematic, and that any of the known standardized valve constructions may be employed. In these the valve stems and seats are readily removable and renewable. The connections 66, 68, and 70 would, in practice, run perpendicular to the drawings, that is, parallel to one another.

Referring now to Figs. 2 and 3, the motor M is geared to the valve stem through a reduction gear train including a worm 80 (Fig. 2) meshing with worm gear 82 driving a shaft 84. At its lower end, this shaft carries a pinion 86 (Fig. 3) meshing with a gear 88 mounted at the upper end of valve stem S. The pinion and gear are preferably broad-faced not only for strength, but also to keep the same almost fully in mesh, despite the axial movement of the valve stem (which, however, is very small).

The gear train preferably includes a lost motion connection, and referring to Figs. 3 and 6, it may be explained that gear 88 is loosely mounted on valve stem S but is operatively connected thereto through spaced driving pins 90 on opposite sides of a finger 92 projecting from hub 94 fixedly mounted on the valve stem. It will be evident that with this arrangement, the motor is permitted to accelerate and acquire considerable starting torque before meeting the load of either closing or opening the valve. This is particularly useful in opening the valve, but is also useful in helping to tightly close the valve, for it should be kept in mind that, ordinarily, the valve is opened only a fraction of a revolution, or, at most, say, one revolution. The preliminary acceleration of the motor helps turn the valve stem at high enough speed so that it is seated with enough force to insure tight closing of the valve.

At its opposite or upper end, the shaft 84 carries a pinion 96 which meshes with a gear 98 mounted on a switch control shaft 100. The reduction ratio of pinion 96 and gear 98 is preferably made substantially greater than that of pinion 86 and gear 88 so that the valve limit discs may exercise their controlling functions well within a single revolution, and preferably much less than a single revolution, of the control shaft. The opening limit disc 12 is a circular disc provided with a peripheral notch 102 (Fig. 2), said notch preferably being substantial in length. The follower 22 is pivoted at 104. Switch 32 is operated by means of a reciprocable plunger 106 resting against follower 22. When the follower bears against the large radius portion of the disc 12, the open limit switch is closed and the motor can operate in valve opening direction, which, in the present case, is counterclockwise, as viewed in plan. When the point 108 of the disc reaches the tip of follower 22, the follower moves into notch 102, thus permitting outward movement of plunger 106 and consequent opening of the limit switch. This deenergizes the motor which, however, may coast somewhat, with further opening of the valve. Thus, the disc 12 may reach the position shown in Fig. 2, in which the tip of the follower is located about halfway between the ends of notch 102. It is for this reason that the notch 102 is preferably made long, in order to accommodate any anticipated coasting of the motor and valve without causing the follower to reach the far end 110 of notch 102, for this would again close the limit switch and thereby upset the desired operating cycle of the machine. It is in order to provide adequate length for notch 102 that a greater reduction ratio is used for the control shaft than for the valve stem. In the particular structure here illustrated, a range of movement of the valve stem anywhere from zero to one revolution is provided for, but it will be understood that if in any particular case an opening of several revolutions is desired, it is merely necessary to appropriately further increase the gear reduction ratio leading to the control shaft.

The amount that the valve is to be opened may be adjusted at will. For this purpose, the open limit disc 12 is not fixedly secured on control shaft 100, but instead is connected thereto through a spring clutch action provided by the four spring arms 112. These spring arms project from a hub which is fast on shaft 100, and they bear tightly against the upper face of limit disc 12. The frictional grip of the spring arms on the disc is great enough to hold the disc in any adjusted position. The range of movement of the disc is preferably limited by means of stop pins 114 which cooperate with a stop finger 116 projecting from one of the four spring arms 112.

If it is desired to prevent all possibility of improper overrunning actuation of the open limit switch, the follower may be arranged with a special pivoted tip, as is illustrated in Figs. 9 through 11 of the drawings. In Fig. 9, the disc 12 and switch 32 are like those previously described, but the follower 22' differs in having a tip 21 pivotally mounted thereon at pivot 23. A light spring 25 is provided which normally moves the tip in counterclockwise direction to the position shown, this movement being limited by a stop 27.

When the valve moves from closed position shown in Fig. 9, to its open position shown in Fig. 10, the follower 22' moves inwardly into notch 102, thus changing the position of switch plunger 106, all as was previously described. If now the valve coasts open to so great an extent that the notch terminal 110 reaches and passes the follower tip 21, the tip simply turns harmlessly out of the way, as is illustrated in Fig. 11. In this way, the follower 22' is not moved outwardly, and the position of switch plunger 106 remains unchanged.

When the valve again closes, the tip 21 is restored to normal position by spring 25 when notch 102 is reached. Reverting to Fig. 9, the tip cannot turn during opening movement of the disc, entirely aside from the effect of spring 25, because of the shape of the tip, it bearing against the disc at a point outside the perpendicular line or radius between pivot 23 and control shaft 100.

It will be understood that the refinement of using a pivoted tip on the follower is not essential, particularly when providing notch 102 with generous length. However, the pivoted tip may be useful if it is desired to use a short instead of a long notch, or if a particular one of the valves is subjected to excessive coasting in an opening direction because of the application of a very high pressure thereto. For example, the pivotal tip may be used on the open limit follower for the release valve.

The closing limit disc 16 (Fig. 3) is generally like the open limit disc 12, but is fixedly mounted on control shaft 100. The only time any adjustment of this disc is needed is after removal and re-facing of the valve seat and valve stem. The necessary adjustment in such case is provided by loosening the set screw 118 (Fig. 3) of pinion 96, and then appropriately resetting the position of the pinion. The advantage of making the adjustment in this way is that there is then no disturbance of the relative adjustment of the other control discs, so that the amount of valve opening and the operation of the transfer disc will all take place in proper relation to true closing of the valve.

It may be pointed out that the closing limit disc functions in opposite direction to the open limit disc, and the follower 26, therefore, preferably points in opposite direction. A long notch is provided on the closing limit disc in order to permit coasting of the valve to final closed position. In other words, I find that it is not necessary to run the valve under power to its final closed position, and instead, the notch in the disc is so positioned that power is cut off from the motor slightly ahead of the fully closed position.

The transfer disc 14 really consists of two relatively movable discs which function in a manner which may be described with reference to Figs. 7 and 8 of the drawings. One of the discs, in this case the disc 120, is fixedly mounted on control shaft 100, while the other, in this case the disc 122, is loosely mounted on the control shaft. The fast and loose discs are connected together by a suitable lost motion connection here exemplified by pin 124 projecting upwardly from lower disc 122 into a slot 126 cut through the upper disc 120. The loose disc 122 is preferably made slightly greater in diameter than the fast disc 120. A single follower 24 is used, it being broad enough to bear against the peripheries of both discs. Both discs are notched, as is indicated at 128 and 130. The arrangement is such that when the fast disc moves in clockwise direction, as shown in Fig. 8, the notches 128 and 130 come into registry, whereas when the fast disc moves in counterclockwise direction, as shown in Fig. 7, the notches 128 and 130 come out of registry and are, therefore, inoperative.

More specifically, in Fig. 8, the valve is closing. Follower 24 is bearing against the periphery of loose disc 122, thus holding the same back until the lost motion in slot 126 is taken up. It is to insure this taking up of lost motion that the loose disc 122 is preferably made slightly greater in diameter than the fast disc 120, and if desired, the effect may be carried even further by slightly roughening or serrating the periphery of disc 122 on each side of notch 130, as is indicated at 132. With the lost motion taken up, the notches come into registry, and therefore the transfer disc assembly, heretofore numbered 14, is a notched disc. The notch is so positioned as to shift the follower 24, and consequently its associated transfer switch, just at, or slightly prior to, closing of the valve. I find that the transfer impulse may precede true closing of the valve because it takes time for the next valve to come into operation, particularly in view of the various relays hereinafter described, and the lost motion connection in the valve gearing, as was previously described.

In Fig. 7, the valve has already been closed and is about to begin opening. It will be manifest that follower 24 bearing against the loose disc will hold the loose disc until the lost motion in slot 126 is taken up, at which time, however, the notches 128 and 130 are out of registration. During the continued opening movement of the valve, the follower 24 is held out and the transfer switch is inoperative.

Referring now to Figs. 12, 13 and 14, it may be pointed out, by way of introduction, that terminal numbers 1 and 2 refer to the main lines 1 and 2; that, in general, line 1 has been used for a common return, while switching operations are performed in line 2; that the number 3 applies to the control circuit of the low pressure valve; the number 4 applies to the control circuit of the high pressure valve; and that number 5 applies to the control circuit of the release valve.

Referring to Fig. 13, lines 1 and 2 lead into a fuse box 140 from which they lead to a master switch or power switch 52. In operation, this is merely a two-pole single throw switch, but in the present case, the wiring is complicated somewhat because the switch is a magnetically operated switch arranged for convenient push-button control. Specifically, the switch is arranged to be closed upon energization of solenoid 142. The circuit of this solenoid runs through normally closed button 144. A normally open starting button 146 is provided. When starting button 146 is pressed, current flows from line 1 through button 146, thence through button 144, thence through conductor 148 to solenoid 142, and thence through conductor 150 back to line 2. The energization of solenoid 142 causes closing of switch 52, whereupon the circuit through solenoid 142 is maintained by means of conductor 152 leading from line 1 below switch 52, to button 144, and thence through lead 148, solenoid 142, lead 150, back to line 2. Momentary pressing of master starting button 146 therefore causes closing of switch 52 which then remains closed indefinitely until stop button 144 is operated. It will be evident that operation of stop button 144 deenergizes solenoid 142 and permits the master switch 52 to move back to its normally open position, where it remains until the master starting button 146 is again pressed.

After preliminary closing of the master switch, as at the beginning of a working day, it is next necessary to press the regular single cycle starting button 60 (Fig. 14) in order to start the valve mechanism. Depression of button 60 closes a circuit between points 5 and 6 on connector A (Fig. 14), and reverting to Fig. 13, it will be seen that contact 5 is connected to line 2, the circuit being by way of conductor 154, conductor 156, normally closed safety button 158, switch pole 160, lead 162, and line 2 conductor 164. Contact 6 of connector A extends by way of wire 166 to terminal 5, which in turn leads through conductor 168 of cable 46 to point 5 of connector B. Referring now to Fig. 12, it will be seen that point 5 of connector B leads through conductor 170 to terminal 5 of terminal strip 172 of the release valve. This in turn is connected by way of conductor 174 to magnet 30 which leads back through conductor 176 to terminal 1, corresponding to line 1, said terminal 1 being connected by means of wires 178 and 180 to point 1 on connector B. Reverting to Fig. 13, it will be seen that point 1 of connector B leads back through conductor 182 of cable 46 to terminal 1, which in turn is connected by conductor 184 to line 1 conductor 186.

Reverting to Fig. 12, the energization of magnet 30 pulls reversing switch 28 from its normal valve opening position to its valve closing position. The motor circuit was, of course, dead because of the opening of open limit switch 32. The closing limit switch 36 was, however, in closed position, and, therefore, the movement of reversing switch 28 to valve closing position causes immediate operation of the motor. At the same time, the movement of the reversing switch is accompanied by closing of holding contact 38. One side of this holding switch is connected to magnet 30 through conductor 188. The other side is connected through conductor 190 to terminal Th (meaning transfer switch of high pressure valve). Terminal Th is connected by conductor 192 to terminal T$_h$ of terminal strip 194 of the high pressure valve. This in turn is connected through lead 196 to the normally closed transfer switch 40, and thence back through lead 198 to terminal 6 of strip 194, which in turn is connected by means of conductors 200 and 202 to point 6 of connector B. Reverting to Fig. 13, point 6 is connected by means of conductor 204 of cable 46 to terminal 6, and thence by means of conductor 206 and conductor 154 back to line 2, through safety switch 158 and switch 160, as was previously described. One end of coil 30 is connected at all times to return line 1. Starting button 60 connects the other end of coil 30 to line 2. Thereupon, holding switch 38 and transfer switch 40 continue to connect coil 30 to line 2. In this way, holding contact 38 functions to maintain magnet 30 energized once the starting button is depressed, and it remains energized until the normally closed transfer switch 40 on the high pressure valve is opened.

At this point, it may be helpful to draw a distinction between the magnetic reversing switch at each motor and the motor itself, because the magnetic reversing switches remain energized and are symbolic of the continued closed or open condition of the valve, whereas the motor is deenergized after it has fulfilled its valve operating function. Thus, in the present case, the release valve must necessarily remain closed throughout most of the operating cycle of the press, and magnet 30 is energized throughout this time. Meanwhile, the motor has run the release valve to closed position. At or near the end of the valve closing operation, the valve closing limit switch 36 is opened, thus deenergizing the motor. When the switch is moved from contact 208, it is moved to contact 210, which is connected through conductor 212 to terminal G of strip 172, which in turn is connected by means of conductor 214 to the green lamp 216 for the release valve. The return from lamp 216 is by way of conductor 218, conductor 220, and conductor 180, to point 1 on connector B, which, as was previously shown, is connected to line 1. The opposite connection to line 2 is readily traced starting from terminal 2 on strip 172 through conductor 222 and conductor 224 to closing limit switch 36.

It is significant, and should be kept in mind, that during the closing of the release valve, the open limit switch 32 changes from the position shown to its opposite position (because the follower 32 rides up on the large radius part of the open limit disc), thereby extinguishing the red indicator lamp 226, and closing the open limit switch for the motor by moving onto contact 228. Of course, the motor cannot run in opening direction because the reversing switch is still held in valve closing direction by the energized magnet 30. However, the open limit switch 32 is then in position to cause the motor to run in valve opening direction whenever magnet 30 is deenergized, for the reversing switch is biased toward the valve opening side. This condition is true in general of all of the limit switches, that is, a limit switch is always prepared or placed in closed condition by the preceding operation. Specifically, closing of any valve incidentally closes the opening limit switch for future opening of the valve, and opening of the valve incidentally closes the closing limit switch for future closing of the valve.

As the release valve reaches its closed position, it closes the transfer switch 34, this being momentarily closed by the registered notches in the pair of transfer discs, all as was previously described. Transfer switch 34 is connected by conductor 230 to terminal 6 of strip 172, and thence by way of conductors 232 and 202 to point 6 of connector B. The transfer switch is also connected by way of conductor 234 to terminal T$_r$ of strip 172, and thence by way of conductor 236 to point 7 of connector B. The transfer switch thus momentarily closes a circuit between points 6 and 7 of connector B.

Reverting now to Fig. 13, point 6 is connected through conductor 204, terminal 6, conductors 206, 154, and 156, to the L$_2$ terminals of clocks 48 and 50, and through safety switch 158 and switch 160, conductors 162 and 164 to line 2. Point 7 on connector B is connected by means of conductor 238 of cable 46 to terminal 7, and thence by way of conductor 240 to the contact C on low pressure clock 48.

The timing clocks 48 and 50 have not been drawn in detail because they are commercially available, the particular clocks here shown being known under the trade-name "Microflex" made by the Eagle Signal Corporation, of Moline, Illinois. The circuit arrangement used is their so-called arrangement No. 1 (although it may be mentioned that terminal A of their data sheet has been changed to C in the present diagram to avoid confusion with the connector A). If desired, the clock 48 may be modified by shortening one of the top trip arms in order to obtain a time difference to better insure dependable starting of the clock 50 by means of the clock 48. In the clock mechanism, the contact C is connected to one end of a solenoid which causes the clock to run as long as the solenoid is energized. Terminal C need be only momentarily energized because appropriate contacts inside the clock maintain the connection between terminal C and line 2 for whtaever time period has been set on the clock by appropriate manipulation of the time setting dial 242. Moreover, a connection is made within the clock between the line 2 terminal and the terminal 2 during the runout time period. At the expiration of the time period, terminal 2 becomes dead and terminal 1 becomes momentarily alive, and after a delay period of approximately one second, it also becomes dead.

Terminal 2 on the low pressure clock is connected back to the valve mechanism in the following manner. It is connected by means of a lead 244 to switch contact 246, switch blade 248, conductor 250, terminal 3, conductor 252 of cable 46, and thence to point 3 of connector B. Reverting to Fig. 12, point 3 of connector B is connected by means of conductor 254 to terminal 3 of terminal strip 256 of the low pressure valve. Terminal 3 is connected by means of conductor 258 to magnet 260 of the reversing switch. The other side of the magnet is connected by means of conductor 262 to terminal 1 of strip 256, corresponding, of course, to line 1. In this way, magnet 260 is energized the moment clock 48 is started, or, what is substantially the same thing, immediately after the transfer switch 34 of the release valve is closed. The low pressure motor thereupon runs to open condition, it being understood, as was previously pointed out, that the reversing switch of the low and high pressure valves are connected oppositely to that of the release valve, they being biased to normal closed condition. Energization of magnet 260 moves the reversing switch from the position shown to the valve opening position. The motor runs until its open limit switch 264 is shifted, thus deenergizing the motor and lighting the red indicator lamp 266, this being done through conductor 268, terminal R of strip 256, and conductor 270. Meanwhile, during opening of the valve, the closing limit switch 272 was, of course, shifted, thus opening the circuit to the green lamp 274, this circuit being through conductor 276, terminal G of strip 256, and conductor 278. At the same time, the closing limit switch 272 is prepared for future closing of the low pressure valve.

At this point, the release valve is closed, the low pressure valve is open, and the press is rapidly closing. The low pressure clock is also running on its time cycle. There is a loss of curing time during the closing of the press, but this is substantially constant and is compensated for in the time set on the low pressure clock. In a typical molding press, the closing time might, for example, be six seconds, in which case the low pressure clock is set for six seconds longer than the desired low pressure curing time. It is readily possible to modify the circuit by providing a motion limit switch on the press, said switch being closed when the die is closed and functioning to start the low pressure clock. However, I prefer to dispense with motion limit switches on the press, or any other change on the press itself, so that the complete apparatus here involved may be considered to be an accessory which need merely be added to an otherwise standard and unchanged press.

When the low pressure clock runs out, the line 2 terminal in the clock is connected for a short time period to terminal 1, momentarily energizing the same. This starts the high pressure clock because terminal 1 on the low pressure clock is connected by means of conductor 280 to terminal C on clock 50. This, as was previously explained, causes the clock to close its own connection from line 2 to terminal C, and also from line 2 to terminal 2. Terminal 2 is connected back to the valve mechanism by way of conductor 282 leading to switch contact 284, switch blade 286, conductor 288, terminal 4, conductor 290 of cable 46, to point 4 of connector B. Reverting to Fig. 12, point 4 of connector B leads by way of wire 292 to terminal 4 on strip 194 of the high pressure valve. This in turn is connected by means of conductor 294 to reversing switch magnet 296, the opposite side of which is connected by means of conductor 298 to terminal 1 of strip 194 which, of course, leads to line 1. Consequently, upon starting of the high pressure clock, the motor of the high pressure valve is started in opening direction.

Meanwhile, back at the low pressure clock, the circuit between line 2 and terminal C, which is the terminal of the operating solenoid, has been broken, and this permits the low pressure clock to reset, ready for the next molding cycle. Moreover, the connection from line 2 to terminal 2 of the low pressure clock is opened, and inasmuch as terminal 2 was connected to the reversing switch magnet 260 of the low pressure valve, all as was previously described, the said magnet 260 is now deenergized, thus permitting the low pressure motor to run the low pressure valve from open to closed condition.

It should be noted that the low pressure valve does not start to close until the high pressure valve has started to open. Consequently, there is a short period of time in which both valves are in the open position. This desirable overlap is accentuated by the fact that in the structure of the clock itself, contact 1 is energized approximately one second before contact 2 is opened. Therefore, the high pressure clock is started, and the high pressure valve begins to open one second before the low pressure valve begins to close. This is in addition to the natural overlap caused by the fact that the initial closing of the low pressure valve is accompanied by at least partial opening of the high pressure valve. This desired operation may be checked by observation of the indicator lamps because the red lamp of the high pressure valve is lighted before the green lamp of the low pressure valve.

At this time, the material in the mold is being cured under high pressure, and the curing time is being measured by running of the high pressure clock. The high pressure clock is in control because its terminal 2 is maintaining the magnet 296 of the high pressure switch in valve open condition. When the high pressure clock runs out its time, the connection within the clock between L2 and terminal 2 is broken, thus deenergizing magnet 296 of the high pressure reversing switch, which in turn permits the switch to shift to closing position, whereupon the valve is closed. As the high pressure valve nears its closed position, it momentarily opens the transfer switch 40, which in the meantime has been steadily maintaining the magnet 30 of the release valve in energized condition, thus keeping the release valve closed. When transfer switch 40 is opened and magnet 30 is deenergized, the holding contact 38 is opened, hence magnet 30 remains deenergized and the release valve, therefore, runs open.

It will be understood that, in the meantime, the closing of the high pressure valve has caused appropriate operation of its open limit switch 300 so as to deenergize the red lamp 302 through terminal R on strip 194 and to close the valve opening circuit of the motor, and appropriate operation of its closing limit switch 304 to deenergize the closing circuit of the motor and to light the green lamp 306 through terminal G on strip 194. Similarly, the opening of the release valve changes the closing limit switch 36 to energize the valve closing circuit of the motor and to deenergize the green lamp 216 through terminal G on strip 172, and also changes the opening limit switch 32 to deenergize the valve opening circuit of the motor and to energize the red lamp 226 through terminal R on strip 172.

It will be noted that in the sequence of operations, there is a difference between the transfer from the high pressure valve to the release valve on the one hand, and the transfer from the low pressure valve to the high pressure valve on the other hand. In transferring from low to high, an overlap occurs, and intentionally so, whereas in transferring from high to release, there must be no overlap. The high pressure valve should be completely cut off before the release valve has had time to start running in the opening direction. It is important that there be no overlap not only to prevent loss of high pressure fluid, but also because when the high pressure valve closes against moving high pressure fluid, there is a terrific water hammer which may crack the pipes or break the pipe fittings. Therefore, the transfer contacts on the high pressure valve must not function prematurely, although it may be mentioned that they can and do function somewhat before the high pressure valve seats in closed position due to the lag in beginning the opening of the release valve (due to relay action, lost motion gear connection, etc.).

Meanwhile, the high pressure clock, of course, resets itself preparatory for another operating cycle, just as was explained in connection with the low pressure clock. Incidentally, it may be pointed out that pilot lamps 308 and 310 may be connected across the $L_1$ to 2 terminals of clocks 48 and 50, as shown in Fig. 13. The pilot lamp shows when the clock is in operation, and is lighted for the duration of the time that the clock is running. It thus shows not only that the clock is functioning, but also the timing of the same. If the wiring is traced, it will be found that these signal lamps are connected directly across the windings of the switch magnets for the low pressure and high pressure valves, and the lamps thus indicate whether or not the valve switches have been energized and how long the respective valves are opened.

It may also be again pointed out that the connections to the magnetic switches of the low and high pressure motors are opposite to the switch connections on the release motor. Specifically, when current is supplied to number 3 terminal on the low pressure motor, the valve runs open, and when the current is cut off, the valve runs closed. Similarly, when current is supplied to number 4 terminal on the high pressure motor, the valve runs open, and when the current is cut off, the valve runs closed. On the other hand, when current is supplied to terminal 5 on the release motor, the release valve runs closed, and when the current is cut off, the release valve runs open (provided that transfer switch 40 on the high pressure motor was operated, which merely means that opening of the release valve is delayed until the pressure valves have been closed, which is as it should be). An important advantage of this is that if all three relays are deenergized, the pressure valves will run closed, and the release valve will run open, this being the safest condition, for it corresponds to immediate opening of the press to its open or normal condition. Reference has heretofore been made to the safety switch or push-button 158. This is normally closed and is connected in series between line 2 and all of the effective line 2 connections running to the motor switch magnets. Consequently, depression of safety button 158 causes the valves and the press to immediately run to the normal or open position, regardless of the previous condition of the press.

When the press is opened, the molded articles are removed in the usual manner and the die cavities are loaded with a fresh supply of molding material, or so-called "pills." The starting button 60 of control panel 58 is again pressed, whereupon the valve mechanism and press goes through another complete molding cycle.

*Manual control*

By manual control, I refer to control of the valve operating motors through independently movable switches. Referring to Fig. 14, the control panel is provided with switches 312, 314 and 316 respectively, controlling the release, the low pressure, and the high pressure valves. These are normally ineffective, but are brought into operative condition by changing the switch lever 54 on the clock panel from the "automatic" position shown in the solid lines to the "manual" position shown in broken lines.

It will be remembered that power is supplied through lines 1 and 2, and the master switch 52. Conductors 186 and 164 lead from master switch 52 to the three-pole switch operated by lever 54, line 1 being connected to the top blade 318, and line 2 being connected through conductor 162 to the center blade 160. In Fig. 13, the switch is shown in "automatic" position, and at this time line 1 is connected through switch blade 318, conductor 322, and conductor 324 to the terminals $L_1$ of the clocks 48 and 50. The only reason the main line current for the clocks is taken through switch blade 318 is to make possible adjustment of contact spacing in the clocks by throwing the switch from "automatic" to "manual" position, at which time the clocks are deenergized without, however, deenergizing the complete valve system. The line 2 current coming through switch blade 160 passes through the safety switch 158 previously referred to. The complete changeover switch is a three-pole switch merely to provide indicator lamps 326 and 328, these being energized by the lowermost switch blade 330. Said switch blade is connected to line 2 through conductor 320 joining switch blades 160 and 330. The return of the lamps to line 1 is through conductor 331.

To bring about manual control, the switch is thrown to opposition position, at which time line 1 is disconnected from the clocks and is connected directly through conductor 332 to point 1 on connector A. Similarly, line 2 is disconnected from the clocks and is connected directly through conductor 334 to point 2 on connector A. Indicator lamp 326 is extinguished and lamp 328 is lighted, thus showing that the circuits are set for manual control.

The complete switching to be obtained is aided by a magnetic switch generally designated 336. This is normally deenergized for automatic operation, but when the switch lever 54 is changed for manual operation, the magnet 338 of switch 336 is energized, thus shifting the switch blades 248 and 286 from the right-hand contacts to the left-hand contacts. The energization of magnet 338 takes place because the magnet is connected through conductor 340 to line 1 and point 1 of connector A, and through conductor 342 to line 2 and point 2 of connector A. (It may be mentioned that points 1 and 2 of connector A are dead during automatic operation, the only line 1 and line 2 connections then being in connector B.)

When magnetic switch 336 is energized, blade 248 interrupts the conenctions between terminals 2 on the low and high clocks to 3 and 4 of connector B, and instead connects points 3 and 4 of connector B to points 3 and 4 of connector A, this taking place through conductors 344, 250 and 346, 288. It will be recollected that the numbers 3 and 4 correspond to magnets of the reversing switches in the low pressure and high pressure valves respectively.

Referring now to Fig. 14, it will be seen that point 3 of connector A leads through conductor 348 to switch 314, while point 4 of connector A leads through conductor 350 to switch 316. It will also be noted that pilot light 352 is connected across points 1 and 2 of connector A, hence shifting the circuits from "automatic" to "manual," lights lamp 352, thus showing that the control panel is set up for manual operation.

The switches 312, 314 and 316 have a common connection 354 which leads to line 2. Closing any of the three switches will connect line 2 to either point 3, 4, or 6 of connector A, the point 6 being connected to switch 312 through lead 356. If the release switch 312 is closed, line 2 is connected to point 6 on connector A, and thence through wire 166 (Fig. 13) to point 5 on connector B, and now, referring to Fig. 12, it will be seen that point 5 of connector B leads through conductor 170, terminal 5 of strip 172, and conductor 174 to magnet 30 of the release valve. Closing of switch 312, therefore, causes the release valve to run closed.

Of course, the limit discs and limit switches function in connection with manual as well as automatic control. Specifically, the release valve motor, in running closed, will run only to the point permitted by the closing limit switch 36, at which time the switch shifts, lighting the green lamp 216. The motor goes dead because of the opening of the limit switch, but the magnet 30 remains energized because of the closing of release switch 312 on control panel 58. The switches 312, 314, and 316 are all simple snap switches, such as toggle switches, which remain closed when closed, and remain open when opened. It will also be kept in mind that during closing of the release valve, the opening limit switch 32 has been prepared for its future function because the follower has ridden out of the notch of the opening limit disc and rests on the large radius periphery of the disc.

Upon opening of release switch 312, the magnet 30 is deenergized and the valve runs open. It may be explained that during manual operation, the holding contact 38 is inoperative. The reason for this is that the current to the holding contact was supplied through normally closed transfer switch 40 of the high pressure valve, which in turn is connected through point 6 of connector B to safety switch button 158, and thence to blade 160 of the three-pole switch. This circuit is now open under manual control, and therefore no current flows through the normally closed transfer switch 40 on the high presure valve, and the holding contact 38 of the release valve. The release valve is maintained in closed position only so long as the release switch 312 of the control panel is kept closed.

Similar remark applies to each of the other valves, and the valves are, therefore, independent of one another exactly as though they were manually cranked, but the actual work of moving the valves is performed by the motors.

Assuming the press to have been closed, the release valve may be opened repeatedly in small increments to obtain a desired position or opening of the press, for example, to facilitate mounting a die in position. The motor-driven valve responds so rapidly to the control switch that the press may be adjusted to desired position with great accuracy.

The release valve should, of course, be closed when either the low or high pressure valve is opened. On closing the low pressure switch 314, the line 2 connection is made to point 3 on connector A, which, referring to Fig. 13, leads through conductor 344, switch blade 248, and conductor 250 to point 3 on B connector. Referring now to Fig. 12, point 3 on B connector leads through conductor 254, terminal 3 of strip 256, and conductor 258, to magnet 260 of the low pressure switch, thus energizing the magnet and causing it to run the low pressure valve open as far as permitted by its open limit switch. Conversely, upon opening the low pressure switch 314 of the control panel, the switch magnet 260 is deenergized, and the valve is run to closed position. At this time, the press remains stationary at whatever point the low pressure switch is opened, for the release valve meanwhile remains closed and the fluid in the press cylinder is locked by the closed valves. By momentarily opening the release switch, the press may be slightly opened, and by momentarily opening the low pressure switch, the press may be slightly closed, in this way bringing the press to any desired position.

In a similar way, the high pressure switch 316 may be used, but this would not be employed for mere adjustment of the press position. Rather, it would be used for testing the proper closing of the die and perhaps for trial cure of pills in the die. Closing of the high pressure switch 316 provides a connection through point 4 on connector A, and thence, in Fig. 13, through wire 346, switch blade 286, and wire 288 to point 4 on connector B, and then, in Fig. 12, through a conductor 292, terminal 4 of strip 194, and wire 294 to magnet 296 of the reversing switch for the high pressure valve.

While the circuits are set for manual operation, the cycle starting button 60 on control panel 58 is made inoperative. This is so because it provides a mere push-button contact and necessitates functioning of holding contact 38 associated with release switch magnet 30 to keep the magnet energized, and, as was previously explained, this holding current circuit is dead during manual operation.

In general, in connection with the manual control, it may be emphasized that closing of the switches on control panel 58 does not necessarily correspond to closing of the valves. It does in the case of release switch 312, but on the contrary, it corresponds to opening of the valves in the case of the low and the high pressure switches 314 and 316. Thus, if all three switches on the control panel are opened, the press immediately runs to normal position, that is, with the low and high pressure valves closed and the release valve open. This is what would happen if the cable 56 were accidentally severed, or the connector A opened.

*Brief summary of operation*

The operation of the automatic valve control apparatus may be briefly summarized as follows: Master starting button 146 is pressed, thus supplying energy to the system. The die is loaded with pills, and the cycle starting button 60 of control panel 58 is pressed, thus starting the cycle. The release valve runs closed. When nearly closed, the closing limit switch cuts out the release motor and it coasts to completely shut position. The transfer switch starts the motor of the low pressure valve in the opening direction and starts the low pressure clock. When the low pressure valve is open, its motor is stopped by opening of the open limit switch. The press then closes and the closing time is allowed for in the time set on the low pressure clock. When the low pressure clock runs out, that is, when the desired treatment or cure of the piece on the low pressure has been finished, it starts the high pressure motor in opening direction and starts the high pressure clock. It also starts the low pressure motor in closing direction after delay of about a second. The check valve prevents backing of the high pressure fluid into the low pressure line. When the high pressure valve is nearly open, its open limit switch stops the motor, and similarly, when the low pressure valve is closed, its closing limit switch stops the low pressure motor.

When the high pressure clock runs out, that is, when the desired treatment or cure under high pressure has been finished, the clock starts the high pressure motor in closing direction.

When the high pressure valve is nearly closed, its closing limit switch shuts off the motor and the valve coasts shut. Also, the transfer switch 40 of the high pressure valve starts the release valve motor in the opening direction. When the release valve is open, its motor is stopped by the open limit switch. The press then opens to its full extent, and during opening of the press the molded pieces may be stripped from the mold in accordance with conventional practice. The mold is then cleaned, loaded with a new supply of pills, and the starting button again pressed, thus starting a new cycle of operation.

It is believed that the construction and operation of my improved automatic valve control system, as well as the many advantages thereof, will be apparent from the foregoing detailed description. The plastic being molded is cured for exactly the desired time. This exactness applies to both the low pressure cure and the high pressure cure, the periods for which are independently adjustable. The adjustment is readily and conveniently made on the large and accurately scaled dials of the timing clocks.

There is less for the operator to do, hence faster press operation and greater output are obtainable. The high pressure valve is opened before the low pressure valve is closed, and each valve when opened is opened all the way without any preliminary "cracking open," with consequent erosion. Standard and dependable valves of the screw stem or needle type may be used, thus minimizing maintenance difficulties and insuring tight valve operation. The valves are operated by small motors, yet are tightly closed and dependably opened. Independent operation of each valve under manual switch control is instantly available by means of an appropriate changeover switch for the valve control circuits.

It will be apparent that while I have shown and described my invention in a preferred form, many changes and modifications may be made in the structure disclosed without departing from the spirit of the invention defined in the following claims.

I claim:

1. An automatic motor operated valve system comprising a release valve, a pressure valve, motor driven means to close the release valve, a second motor driven means responsive to closing of the release valve for opening the pressure valve, and for starting a timing device, means responsive to said timing device for reversing said second motor driven means and thereby closing the pressure valve, and means responsive to closing of the pressure valve for reversing said first motor driven means and thereby opening the release valve.

2. An automatic motor operated valve system for a hydraulic press including a piston and cylinder driven from low and high pressure liquid supply sources, said valve system comprising a release valve connected to said cylinder, a low pressure valve between said cylinder and said low pressure source, a high pressure valve between said cylinder and said high pressure source, means to close the release valve, means responsive to closing of the release valve for opening the low pressure valve, means operative after a predetermined time interval for opening the high pressure valve and for closing the low pressure valve, means operative after an independently predetermined time interval for closing the high pressure valve, and means responsive to closing of the high pressure valve for opening the release valve.

3. An automatic motor operated valve system comprising a release valve, a low pressure valve, a high pressure valve, a check valve to prevent loss of high pressure fluid through the low pressure line, two timing clocks, means to close the release valve, means responsive to closing of the release valve for opening the low pressure valve and for starting one timing clock, means responsive to said clock for opening the high pressure valve and for closing the low pressure valve and for starting the second timing clock, means responsive to said second clock for closing the high pressure valve, and means responsive to closing of the high pressure valve for opening the release valve.

4. An automatic motor operated valve system comprising valves of the screw stem type, a reversing electric motor for operating each of said valves, reduction gearing including a lost motion connection between each motor and its valve stem, one of said valves acting as a release valve, and another as a pressure valve, a timing clock, means responsive to closing of the release valve for opening the pressure valve and for starting the timing clock, means responsive to said clock for closing the pressure valve, and means responsive to closing of the pressure valve for opening the release valve.

5. An automatic motor operated valve system comprising three valves of the screw stem type, a reversing electric motor for operating each of said valves, reduction gearing between each motor and its valve stem, one of said valves acting as a release valve, another as a low pressure valve, and the third as a high pressure valve, means responsive to closing of the release valve for opening the low pressure valve, means operative after a predetermined time interval for opening the high pressure valve and for closing the low pressure valve, means operative after an independently predetermined time interval for closing the high pressure valve, and means responsive to closing of the high pressure valve for opening the release valve.

6. An automatic motor operated valve system for a hydraulic press, said system comprising three valves of the screw stem type, a reversing electric motor for operating each of said valves, reduction gearing including a lost motion connection between each motor and its valve stem, one of said valves acting as a release valve, another as a low pressure valve, and the third as a high pressure valve, a check valve to prevent loss of high pressure fluid in the low pressure line, two timing clocks, means responsive to closing of the release valve for opening the low pressure valve and for starting one timing clock, means responsive to said clock for opening the high pressure valve and for closing the low pressure valve and for starting the second timing clock, means responsive to said second clock for closing the high pressure valve, and means responsive to closing of the high pressure valve for opening the release valve.

7. In combination, a valve, and transfer means responsive to movement of the valve in one direction for initiating a succeeding operation, said means including a notched member moved with the valve, a second notched member moved by the first notched member but with lost motion therebetween such that when moved in one direction the notches are in alignment, and when moved in the opposite direction the notches are disaligned, said first direction being that in which the succeeding operation is to be initiated, and a follower bearing simultaneously against both members and urged into said notches, whereby said follower moves into said notches when said notches are aligned by movement in the first direction, and is prevented from moving into said notches when said notches are disaligned by movement in the opposite direction.

8. In combination, two valves, a driving motor for each valve, and means responsive to closing of one of the valves for opening the other valve, said means including a notched member moved with the valve, a second notched member moved by the first notched member but with lost motion therebetween such that when moved in the closing direction the notches are in alignment, and when moved in the opening direction the notches are disaligned, a follower bearing simultaneously against both notched members, and a switch controlled by said follower for starting the motor of the other valve.

9. In combination, two valves, a driving motor for each valve, a timing clock, transfer means responsive to closing of one of the valves for starting the timing clock, and transfer means responsive to closing of the other valve for opening the first valve, each said transfer means including a notched member moved with the associated valve, a second notched member moved by the first notched member but with lost motion therebetween such that when moved in the closing direction the notches are in alignment, and when moved in the opening direction the notches are disaligned, a follower bearing simultaneously against both members, and a transfer switch controlled by said follower, the transfer switch on the first valve functioning to start the aforesaid timing clock, and the transfer switch on the second valve functioning to start the motor of the first valve.

10. An automatic motor operated valve system comprising a plurality of valves, a motor for operating each of said valves, one of said valves acting as a release valve, another as a pressure valve, transfer discs connected to the valves, each transfer disc comprising a pair of discs one of which is secured to its shaft, and the other of which is loose on its shaft but connected to the fast disc by a lost motion connection, said fast and loose discs being so notched that the notches are in alignment when moving in closing direction, and are out of alignment when moving in opening direction, followers bearing against said discs, there being one transfer follower bearing against the pair of discs making up a transfer disc, switches controlled by said followers, and a timing clock, said switches, motors, and timing clock being so interconnected that closing of the release valve causes its transfer disc to register and begin opening of the pressure valve and running of the clock, said clock thereafter causing closing of the pressure valve, the transfer disc of the pressure valve then registering and causing opening of the release valve.

11. An automatic motor operated valve system comprising three valves, a motor for operating each of said valves, one of said valves acting as a release valve, another as a low pressure valve, and the third as a high pressure valve, transfer discs connected to the release and high pressure valves, each transfer disc comprising a pair of discs, one of which pair is secured to its shaft, and the other of which is loose on its shaft but connected to the fast disc by a lost motion connection, said fast and loose discs being so notched that the notches are in alignment when moving in closing direction, and are out of alignment when moving in the opening direction, followers bearing against said discs, there being one transfer follower bearing against the pair of discs making up a transfer disc, switches controlled by said followers, and two timing clocks, said switches, motors, and timing clocks being so interconnected that closing of the release valve causes its transfer disc to register and begin opening of the low pressure valve and running of the low pressure clock, said clock thereafter causing opening of the high pressure valve and closing of the low pressure valve and starting of the high pressure clock, said high pressure clock thereafter causing closing of the high pressure valve, the transfer disc of the high pressure valve then registering and causing opening of the release valve.

12. An automatic motor operated valve system for a hydraulic press, said system comprising three valves of the screw stem type, a reversing electric motor for operating each of said valves, reduction gearing between each motor and its valve stem, one of said valves acting as a release valve, another as a low pressure valve, and the third as a high pressure valve, a switch controlling shaft associated with each valve, a notched closing limit disc on each shaft, an adjustably mounted notched open limit disc on each shaft, an additional transfer disc on the shafts of the release and high pressure valves, each transfer disc comprising a pair of discs, one of which pair is secured to its shaft, and the other of which is loose on its shaft but connected to the fast disc by a lost motion connection, said fast and loose discs being so notched that the notches are in alignment when moving in the closing direction, and are out of alignment when moving in the opening direction, followers bearing against said discs, there being one transfer follower bearing against the pair of discs making up a transfer disc, switches controlled by said followers, and two timing clocks, said switches, motors, and timing clocks being so interconnected that closing of the release valve causes its transfer disc to register and begin opening of the low pressure valve and running of the low pressure clock, said clock thereafter causing opening of the high pressure valve, closing of the low pressure valve, and starting of the high pressure clock, said high pressure clock thereafter causing closing of the high pressure valve, the transfer disc of the high pressure valve then causing opening of the release valve, the duration of operation of the motors being determined by the limit switches.

13. An automatic valve control system for an hydraulic press having a cylinder driven by a pressure fluid source, said system comprising a plurality of valves connected to said cylinder, electric motors for operating said valves, magnetically controlled reversing switches for said motors, said switches being normally biased in one direction but operable on energization of the magnets for motor drive in opposite direction, one of said valves acting as a release valve, and another as a pressure valve located between the pressure fluid source and the cylinder, the reversing switch of the release valve being biased to valve opening position, and the reversing switch of the pressure valve being biased to valve closing position.

14. An automatic valve control system for an hydraulic press having a cylinder driven by low and high pressure fluid sources, said system comprising three valves connected to said cylinder, three electric motors for operating said valves, magnetically controlled reversing switches for said motors, said switches being normally biased in one direction but operable on energization of the magnets for motor drive in opposite direction, one of said valves acting as a release valve, another as a low pressure valve located between the low pressure source and the cylinder, and the third as a high pressure valve located between the high pressure source and the cylinder, the reversing switch of the release valve being biased to valve opening position and the reversing switches of the low and high pressure valves being biased to valve closing position.

15. A motor-operated valve system, comprising a plurality of valves, reversing electric motors for operating said valves, one of said valves acting as a release valve, and another as a pressure valve, a timing device, automatic and manual valve control circuits, and a change-over switch for making one circuit or the other effective, said automatic circuit including a starting button to initiate closing of the release valve, means responsive to closing of the release valve for opening of the pressure valve and for starting said timing device, means responsive to said timing device for closing the pressure valve, and means responsive to closing of the pressure valve for opening the release valve, said manual circuit including manually manipulatable switches for independent control for each of the motors.

16. A motor-operated valve system, comprising three valves, reversing electric motors for operating said valves, one of said valves acting as a release valve, another as a low pressure valve, and the third as a high pressure valve, two timing devices, automatic and manual valve control circuits, and a change-over switch for making one circuit or the other effective, said automatic circuit including a starting button to initiate closing of the release valve, means responsive to closing of the release valve for opening the low pressure valve and for starting one timing device, means responsive to said first timing device for opening the high pressure valve and for closing the low pressure valve and for starting the second timing device, means responsive to said second timing device for closing the high pressure valve, and means responsive to closing of the high pressure valve for opening the release valve, said manual circuit including manually manipulatable switches for independent control for each of the motors.

17. An automatic motor-operated valve system for an hydraulic press, said system comprising three valves of the screw-stem needle type, motor means for operating said valves, gearing between the motor means and its valve stem, one of said valves acting as a release valve, another as a low pressure valve, and the third as a high pressure valve, a control shaft associated with each valve, an open limit cam disc on each shaft, an additional disc assembly on the shafts of the release and high pressure valves, each of said additional disc assemblies comprising a pair of discs, one of which pair is secured to its shaft and the other of which is loose on its shaft but connected to the fast disc by a lost-motion connection, said fast and loose discs being so notched that the notches are in alignment when moving in the closing direction and are out of alignment when moving in the opening direction, followers bearing against said discs, there being one follower bearing against each pair of discs making up a disc assembly, switches controlled by said followers, and two timing clocks, said switches, motors and timing clocks being so interconnected that closing of the release valve causes its disc assembly to register and begin opening of the low pressure valve and running of the low pressure clock, said clock thereafter causing opening of the high pressure valve, closing of the low pressure valve, and starting of the high pressure clock, said high pressure clock thereafter causing closing of the high pressure valve, and the disc assembly of the high pressure valve then causing opening of the release valve.

18. An automatic motor-operated valve system for an hydraulic press, said system comprising three valves of the screw-stem needle type, a reversing electric motor for operating each of said valves, reduction gearing between each motor and its valve stem, one of said valves acting as a release valve, another as a low pressure valve, and the third as a high pressure valve, a control shaft associated with each valve, an open limit cam disc on each shaft, an additional disc assembly on the shafts of the release and high pressure valves, each of said additional disc assemblies comprising a pair of discs, one of which pair is secured to its shaft and the other of which is loose on its shaft but connected to the fast disc by a lost-motion connection, said fast and loose discs being so notched that the notches are in alignment when moving in the closing direction and are out of alignment when moving in the opening direction, followers bearing against said discs, there being one follower bearing against each pair of discs making up a disc assembly, switches controlled by said followers, and two timing clocks, said switches, motors and timing clocks being so interconnected that closing of the release valve causes its disc assembly to register and begin opening of the low pressure valve and running of the low pressure clock, said clock thereafter causing opening of the high pressure valve, closing of the low pressure valve, and starting of the high pressure clock, said high pressure clock thereafter causing closing of the high pressure valve, and the disc assembly of the high pressure valve then causing opening of the release valve.

19. An automatic motor operated valve system comprising a release valve, a pressure valve, motor driven means to close the release valve, a second motor driven means responsive to closing of the release valve for opening the pressure valve, and for starting a timing device, means responsive to said timing device for again actuating said second motor driven means and thereby closing the pressure valve, and means responsive to closing of the pressure valve for again actuating said first motor driven means and thereby opening the release valve.

20. An automatic valve control system for an hydraulic press having a cylinder driven by a pressure fluid source, said system comprising a plurality of valves connected to said cylinder, electric motor driven means for opening or closing said valves, magnetic control means for said motor driven valve operating means, said control means being normally biased in one direction but operable on energization of the magnets for movement in opposite direction, one of said valves acting as a release valve, and another as a pressure valve located between the pressure fluid source and the cylinder, the control means of the release valve being biased to valve opening position, and the control means of the pressure valve being biased to valve closing position.

21. An automatic valve control system for an hydraulic press having a cylinder driven by low and high pressure fluid sources, said system comprising three valves connected to said cylinder, electric motor driven means for opening or closing said valves, magnetic control means for said motor driven valve operating means, said control means being normally biased in one direction but operable on energization of the magnets for movement in opposite direction, one of said valves acting as a release valve, another as a low pressure valve located between the low pressure source and the cylinder, and the third as a high pressure valve located between the high pressure source and the cylinder, the control means of the release valve being biased to valve opening position and the control means of the low and high pressure valves being biased to valve closing position.

GORDON B. SAYRE.